United States Patent [19]

Ito

[11] Patent Number: 5,540,377
[45] Date of Patent: Jul. 30, 1996

[54] SOLDER BALL PLACEMENT MACHINE

[76] Inventor: Carl T. Ito, 9882 E. Caron St., Scottsdale, Ariz. 85258

[21] Appl. No.: 276,171
[22] Filed: Jul. 15, 1994
[51] Int. Cl.$^6$ .................................................... B23K 3/06
[52] U.S. Cl. .......................................... 228/41; 294/64.1
[58] Field of Search ..................... 228/246, 41; 294/64.1

[56] References Cited

U.S. PATENT DOCUMENTS

| 3,724,687 | 4/1973 | Marschke et al. ...................... 294/64.1 |
| 4,673,772 | 6/1987 | Satoh et al. ................................ 174/52 |
| 5,060,844 | 10/1991 | Behun et al. ............................ 228/180 |
| 5,075,965 | 12/1991 | Carey et al. ............................... 29/840 |
| 5,088,639 | 2/1992 | Gondotra et al. .................... 228/246 X |
| 5,118,027 | 6/1992 | Braun et al. ............................. 228/180 |
| 5,137,845 | 8/1992 | Lochon et al. .......................... 437/183 |
| 5,207,467 | 5/1993 | Smith ..................................... 294/64.1 |
| 5,219,117 | 6/1993 | Lin .......................................... 228/253 |
| 5,414,955 | 5/1995 | Morin ................................. 294/64.1 X |

Primary Examiner—Kenneth J. Ramsey
Attorney, Agent, or Firm—Cahill, Sutton & Thomas P.L.C.

[57] ABSTRACT

A solder ball placement system incorporating a placement head moveable vertically toward and away from a solder ball shuttle having a plurality of solder balls positioned thereon. A corresponding plurality of pickup tubes extend from the placement head and are connected to a vacuum source for attracting and holding a corresponding solder ball. The pickup tubes are mounted for limited vertical movement with respect to the placement head to allow the individual pickup tubes to extend into the placement head varying distances to accommodate for uneven placement of solder balls such as warpage of a workpiece or shuttle. The respective pickup tubes each incorporate a collar abutting against a vibrator plate that is actuated by an ejector solenoid when the vacuum is released and the solder balls are to be placed on a workpiece. A ball sensing system incorporates a diode array having temperature sensitive PN junctions which are subjected to a heat source on one side and the cooling effect of ambient air traveling through pickup tubes on the other side. Sampling of the voltage drop across the respective diodes presents an indication of the presence or absence of solder balls on the respective pickup tubes.

16 Claims, 2 Drawing Sheets

SOLDER BALL PLACEMENT MACHINE

FIELD OF THE INVENTION

The present invention pertains to solder positioning systems, and more particularly, to systems for positioning solder balls on workpieces.

BACKGROUND OF THE INVENTION

In the processing of electronic components, and particularly in the processing of integrated circuit chips, it is frequently necessary to precisely place flux and solder at a precise location to permit the firm interconnection with the component or IC with another similar electrical elements. The patterns of conductors frequently provided on electrical packaging as well as IC's and the like include gold plated copper pads to which a solder compound may be applied for the interconnection of that pad to an external conductor. The precise placement of such solder is critical and the utilization of different types of solder and the process for applying the solder has become a complicated problem presented to the utilization of minute amounts of solder on very small pads.

A solution to the above problems, and a means to facilitate automation includes the utilization of discrete particles of solder and soldering compound formed into small balls. These solder balls, typically 30,000 of an inch in diameter must be accurately placed on appropriately prepared pads to permit the subsequent reflowing of the solder to thereby complete an electrical interconnection. These small solder balls are difficult to handle and create problems with machinery intended to automatically place the balls at specific locations. The efficient and dependable attracting and holding of individual solder balls with the subsequent accurate placement is further complicated by the prior art's inability to inexpensively detect the absence or presence of the solder ball when is being retrieved from a storage source or temporary transport mechanism and placed at a predetermined location on a workpiece; the difficulties are compounded by the frequent presence of flux material that can render the solder balls difficult to work with.

OBJECTS OF THE INVENTION

It is therefore an object of the present invention to provide an improved solder ball placement systems.

It is another object of the present invention to provide a solder ball positioning mechanism incorporating means for efficiently and effectively picking up and positioning individual solder balls at a minimum expense.

It is still another object of the present invention to provide a means for picking up an array of solder balls with a plurality of tubes and to provide for the subsequent placement of those solder balls at predetermined locations on a workpiece.

It is still another object of the present invention to provide a means for efficiently picking up a plurality of solder balls, detecting the presence or absence of the solder balls, and effectively depositing those solder balls is a predetermined pattern on a workpiece.

These and other advantages will become apparent to those skilled in the art as the description thereof proceeds.

SUMMARY OF THE INVENTION

The present invention incorporates a solder ball placement machine utilizing a vertically moveable head within which a ball grid array placement head is positioned. The placement head moves vertically away from and toward a workpiece and includes a plurality of vacuum pickup tubes positioned in an array corresponding to the array of the intended solder ball pattern. Each pickup tube is independently vertically moveable with respect to the placement head such that as the head is lowered the individual pickup tubes contact their corresponding solder ball to attract and hold the solder ball. Each pickup tube incorporates sufficient over-travel capabilities to permit the placement head to be lowered to insure that all pickup tubes contact their corresponding solder balls; in this manner, non-linearities in the flat surface of the workpiece are accommodated since the individual solder balls may be picked up and released even though they may not be in a common horizontal place. A vacuum chamber or plenum communicates with the interior of the pickup tubes to provide a vacuum for attracting the respective solder balls while the individual pickup tubes incorporate a shoulder abutting against a vibrator plate to assist in the release of the respective solder balls when they are being placed on the workpiece. A ball detector system incorporating a diode array is utilized to detect the presence or absence of solder balls at the end of the respective vacuum pickup tubes.

BRIEF DESCRIPTION OF THE DRAWINGS

The present invention may more readily be described by reference to the accompanying drawings in which.

DETAILED DESCRIPTION OF THE INVENTION

Figure 1:
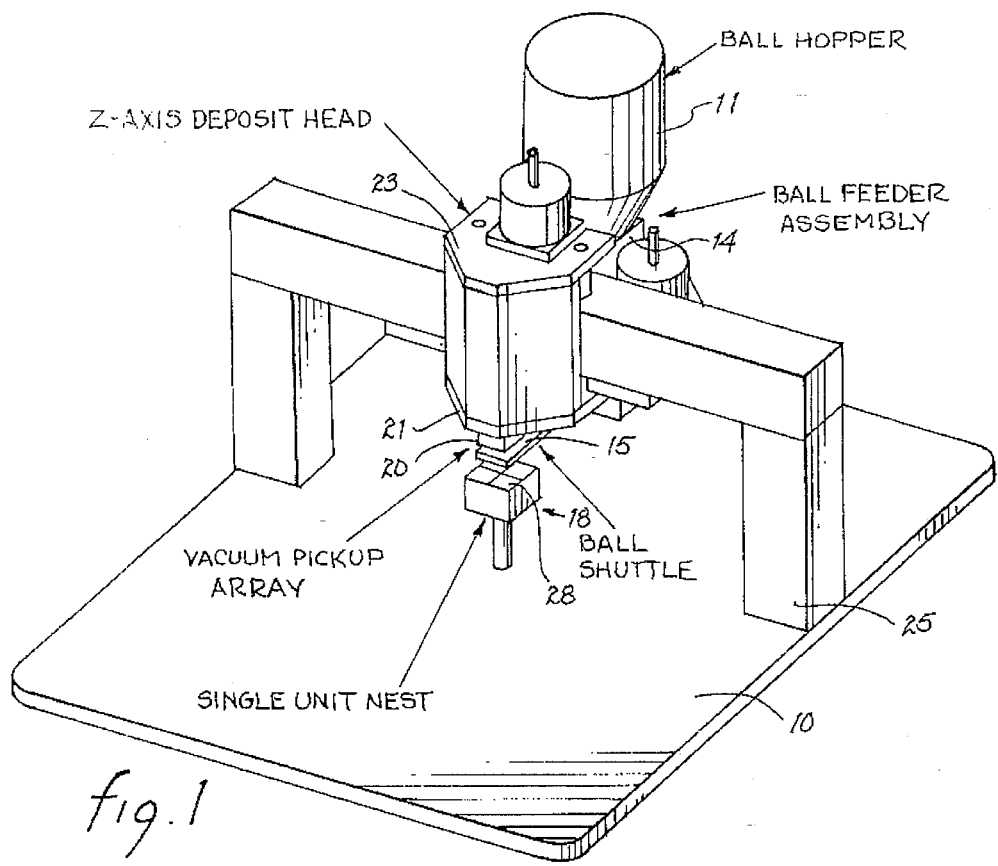
FIG. 1 is a schematic representation of a solder ball placement machine incorporating the solder ball array placement head constructed in accordance with the teachings of the present invention.

Referring now to FIG. 1, a schematic drawing is shown of a solder ball placement machine constructed in accordance with the teachings of the present invention as shown. The machine may be mounted on a supporting surface or platform 10 and includes a ball hopper 11 for receiving a supply of solder balls to be strategically positioned on a workpiece. The hopper 11 gravity feeds a ball feeder assembly 14 which loads an appropriate array of solder balls onto a ball shuttle 15 for transfer from the feeder assembly area to a staging or work area 18. A vacuum pickup array 20 is positioned on a mounting plate 21 secured to a Z-axis head 23. The head is vertically moveable to thereby raise and lower the vacuum pickup array 20; the head is mounted on frame member 25 which in turn is mounted on the platform 10.

A workpiece mounting receptacle 28 is positioned beneath the vacuum pickup array 20 to support a workpiece onto which the solder balls are to be positioned. Solder balls within the ball hopper 11 are thus arranged by the ball feeder assembly 14 onto the ball shuttle 15 which is then moved into position beneath the vacuum pickup array 20 and above the workpiece positioned on the mounting receptacle 28.

The vacuum pickup array 20 is then vertically lowered to contact and pick up the solder balls on the ball shuttle; the ball shuttle is subsequently moved horizontally away from the pickup array and the latter is vertically lowered to place the solder balls on the workpiece. The schematic representation of FIG. 1 is useful to understand the placement of the system of the present invention in apparatus for retrieving solder balls from a hopper and strategically placing the solder balls at appropriate locations on a workpiece.

Figure 2:
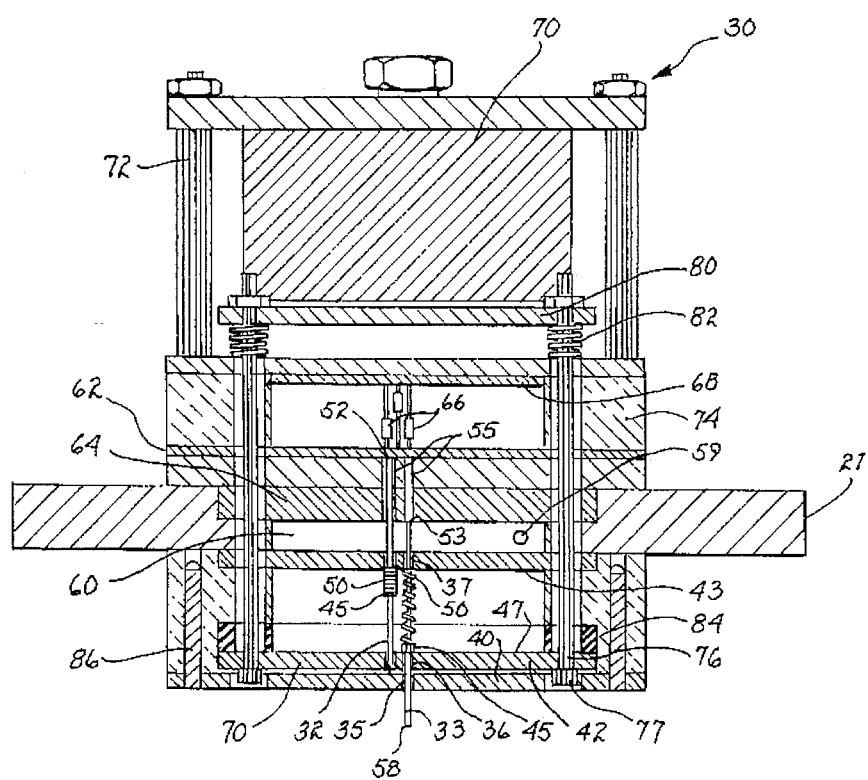
FIG. 2 is a cross-sectional view of a ball grid array placement head constructed in accordance with the teachings of the present invention.

Referring now to FIG. 2, a cross-sectional view of a ball grid array placement head constructed in accordance with the teachings of the present invention is shown. The placement head 30 is secured to the mounting plate 21 and is thus moveable in the vertical direction to be lowered into position for contacting solder balls to be positioned. The drawing of FIG. 2 is simplified to facilitate the description of the invention and includes only two pickup tubes; it will be appreciated that a complete array of pickup tubes will normally be provided. The placement head includes a plurality of pickup tubes such as those shown at 32 and 33 constructed of hollow metal tubular members mounted for sliding vertical movement through holes 35, 36, and provided therefor in a pattern plate 40, a vibrator plate 42, and a vacuum plate 43, respectively. Thus, the individual pickup tubes are slidably vertically positionable to an extended position as shown by the pickup tube 33 and a fully retracted position shown by the pick tube 32. Each of the pickup tubes includes a collar 45 strategically positioned along its length to serve as an abutment for contacting the inner surface 47 of the vibrator plate 42 and also for acting as a contacting surface for one end of a biasing coil spring 50. The opposite end of the coil spring abuts the vacuum plate 43. It may be noted that the pattern plate includes a hole 35 positioned to permit the pickup tube 33 to extend therethrough; however, no hole is provided in the pattern plate to permit the pickup tube 32 to be vertically extended. The pattern plate may thus be chosen to provide a predetermined number of pickup tube holes in a selected pattern so that the placement head may be modified to accommodate a great variety of solder ball patterns; that is, on work pieces requiring a selected pattern of solder ball placement, all of the pickup tubes may not be required. Those tubes that are not required are thus held out of operative position by being maintained in their fully retracted position by the selected pattern plate. Typically, an array of pickup tubes will be arranged in a square pattern having twenty-three columns of twenty-three pickup tubes positioned within an area less than two square inches.

The internal diameter of the pickup tubes 32, 33 is chosen in accordance with the size of the solder balls with which the tubes are to be used; a range of sizes of solder balls may be encountered for a particular application. For example, it has been found that pickup tubes having an outside diameter of 0.035 inches and an inside diameter of 0.012 inches are appropriate for utilization in the handling of solder balls having a diameter of 0.030 inches. The upper ends 52, 53 of the pickup tubes 32, 33, respectively, extend into corresponding thermal cell channels provided therefor. Each thermal cell channel 55 corresponds to a different pickup tube and comprises a cylindrical passageway having an diameter sufficiently greater than the outside diameter of the pickup tube to permit the flow of air from the pickup tip 58 of the pickup tube, through the tube, into the corresponding thermal cell channel, around the circumferential space between the outside diameter of the pickup tube and the thermal cell channel wall to a vacuum plenum or chamber 60.

The plenum chamber 60 is evacuated through the utilization of a conventional vacuum pump connected to the chamber through a port 59; the vacuum pump is conventional and forms no part of the present invention. The pressure within the vacuum chamber is typically reduced to 14 psia. It is therefore apparent that only a slight vacuum is required and that a pressure 0.7 inches below atmospheric is sufficient. The volume of air moved by the application of the vacuum to the back of the pickup tubes is very small.

A flow sensor matrix printing circuit board 62 is mounted on top of the flow sensor plate 64 and includes copper traces (not shown in FIG. 1) forming one half of the conductors of a diode matrix. A plurality of diodes 66 are secured between the flow sensor matrix printed circuit board 62 and a second flow sensor matrix printed circuit board 68 which also includes a plurality of copper traces orthogonally arranged with respect to the copper traces on the first flow sensor matrix printed circuit board. The printed circuit boards 62 and 68 and diodes 66 electrically form a diode matrix such that individual diodes may be addressed using conventional addressing techniques for X and Y positions in a manner well known in the art.

An ejector solenoid 70 is mounted on solenoid support rods 72 secured to the placement head body 74. Ejector pull rods 76 incorporate enlarged heads 77 contacting the lower surface 79 of the vibrator plate 42. The pull rods 77 extend upwardly through the placement head body 74 and are secured to an ejector actuator plate 80. The actuator plate 80 is supported above the placement head body 74 by ejector preload springs 82. It may be noted that the vibrator plate 42 is held into firm contact with an elastomer gasket 84 contacting the inner surface 47 of the vibrator plate 42 by the ejector pull rods. The pattern plate 40 is held in precise alignment with the corresponding pickup tubes through pattern plate guide pins 86 extending into the placement head body. The ball grid array placement head of FIG. 2 is thus moveable in the Z axis in a manner described in connection with FIG. 1 to raise and lower the pickup tubes into contact with solder balls for retrieving the solder balls from a shuttle and for depositing the retrieved solder balls onto a workpiece in an appropriate location.

Figure 3:
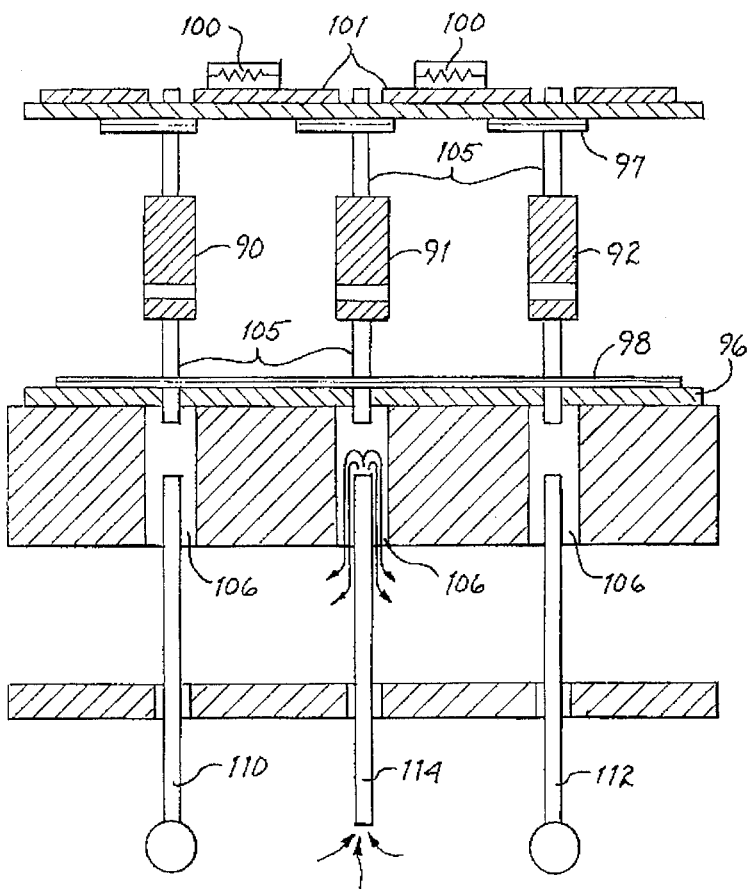
FIG. 3 is a cross-sectional schematic view, enlarged, of a portion of a ball grid array placement head of FIG. 2 showing the operational interrelationship of some of the elements of the present invention.

The operation of the ball grid array placement head shown in FIG. 2 may be described by reference to FIG. 3. FIG. 3 is a cross-sectional schematic view of a portion of the ball grid array placement head of FIG. 2. Referring now to FIG. 3, the diodes 90, 91 and 92 of a diode array are shown connected between the upper flow sensor matrix printed circuit board 95 and the lower flow sensor matrix printed circuit board 96. The respective circuit boards incorporate circuit traces 97 and 98, respectively, orthogonally arranged to place the diodes in a rectangular array in a manner well known. In the embodiment chosen for illustration, the upper printed circuit board is in the electrical position of the cathode with respect to the diodes of the diode array while the lower printed circuit board is in the electrical position of anode. A heat source which in FIG. 3 comprises one or more resistors 100 in thermal contact with a copper plate 101 is utilized to provide heat to the diodes. The amount of heat required is modest and only a slight temperature rise above ambient is necessary to permit the diodes to function as solder ball detectors. It may also be noted that the leads 105 from the diodes extend through the respective printed circuit boards to provide thermal contact with both the heat source 100 at one end thereof and the thermal cell channels 106 on the other end thereof. The PN junction of the diodes exhibit a temperature/voltage dependence such that a voltage change may readily be detected when a slight temperature difference occurs. Thus, if the temperature existing at the diode is different than the original temperature experienced by the diode, a voltage change or level can be readily detected. Thus, electrically detecting the voltage drop across the respective PN junction of the diodes is an indication of the temperature of the corresponding diode.

In FIG. 3 there are three pickup tubes shown, each of which extends through the pattern plate. Pickup tube 110 and pickup tube 112 have each contacted a corresponding solder ball which is drawn against the tube and held there by the atmospheric pressure pressing against the respective ball in view of the pressure differential caused by the vacuum admitted to the upper open end of the respective pickup tube. However, pickup tube 114 has failed to contact and secure a solder ball at the end thereof; as a consequence, air is admitted into the tube and flows upwardly through the tube into the thermal cell channel 106 at the top of the tube adjacent the end of the corresponding diode. Thus, ambient air, which is at a lower temperature than the heat source temperature, flows past the one end of the diode 91 while the opposite end of that diode is at the heat source temperature. The temperature at that diode will result in a predetermined voltage. In contrast, pickup tubes 110 and 112 do not admit atmospheric air therethrough into their corresponding thermal cell channels causing the temperature existing at the ends of their respective diodes to remain at a higher temperature closer to the temperature of the heat source. The temperature of the diodes 90 and 92 is thus significantly less than of the diode 91 and the voltage across the diodes is detectably different than diode 91. Therefore, by sequentially addressing the respective diodes in the diode array, those diodes failing to secure a solder ball at the ends thereof are readily detected. In those instance, such a shown in FIG. 2, wherein selected pickup tubes are maintained in the retracted position through the utilization of a pattern plate, the upper ends of the pickup tubes are maintained in their maximum retracted position such that the upper ends thereof are close to the top of the corresponding thermal cell channel thus significantly reduce the flow of ambient air through the tube and thereby permit the corresponding end of the diode to remain relatively warm and closer to the temperature of the heat source. Of course, if a specific pattern plate is chosen in a particular application, then the condition of the diode corresponding to the retracted pickup tube may not be important; however, the capability of detecting the condition of the diode may be useful in diagnostic routines to confirm that the proper pattern plate has been installed on the placement head for a particular application.

The specific diodes utilized in the system of the present invention are not particularly important; however, it has been found that any PN junction device may be used provided its temperature/voltage characteristic is suitably sensitive to small temperature differentials, e.g. 5° C. to 10° C. Further, the greater the thermal conductivity of the path from the PN junction to the heat source and to the thermal cell channel the more responsive the array becomes to temperature differentials.

Figure 4:
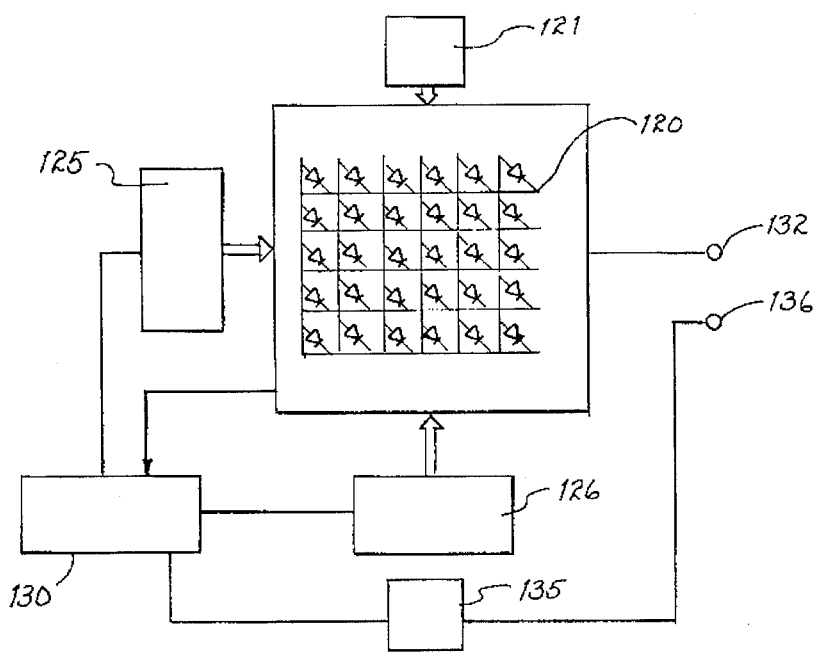
FIG. 4 is a block diagram of a control system for the operation of the solder ball placement system of the invention.

Referring now to FIG. 4 a functional block diagram of a suitable control system for operation of the solder ball placement system of the present invention is shown. A diode array 120 is provided utilizing a plurality of diodes arranged at intersections of orthogonally related X and Y conductors. Each of the diodes corresponds to one of the diodes described above and is associated with a respective one of the pickup tubes. A constant current source 121 is provided to the array, and address counters 125 and 126 operating under the control of a processor or computer 130 sequentially addresse the respective diodes. The timing and sequence of the accessing of the respective diodes is under the control of the processor 130 in accordance with conventional computer programming techniques. The voltage drop across each of the respective diodes is thus sequentially measured and provided to output terminal 132. The voltage level represents the temperature of the respective diode and thus represents the presence or absence of a solder ball on the corresponding pickup tube. A clock source 135 provides an appropriate clock pulse to the processor 130 and to output terminal 136 to permit synchronization of the output signal with other equipment.

The operation of the solder ball placement system of the present invention may be described as follows. The system will normally operate under the control of associated machinery and/or controllers (not shown) providing appropriate energization of vacuum sources at the proper time and energization of the ejector solenoid. The timing of these events may be under the control of any of a variety of typical position sensors used to sense the vertical position of the placement head, the position of the solder ball shuttle and the placement of an IC or other workpiece in the appropriate position beneath the ball placement system. In operation, the appropriate pattern plate is secured to the bottom of the placement head having a pattern of holes therein corresponding to the solder ball pattern to be utilized with the workpiece. With the pattern plate 40 in place, the selected pickup tubes, such as pickup tube 33 extend therefrom and are urged downwardly through the openings provided therefor such as opening 35 in the pattern plate by the force of the corresponding bias spring. The collar 45 of the pickup tube 33 abuts the inner surface 47 of the vibrator plate 42. A vacuum is applied to the vacuum chamber 60 through the vacuum port 59; the entire solder ball placement system is then lowered with the mounting flange 21 until the pickup tubes contact the solder balls positioned on a ball shuttle 15. The solder balls have been placed in the shuttle by a mechanism not forming a part of this invention and are typically presented to the solder ball placement system in the form of a tray having detents or holes therein each of which positions a solder ball to be grasped by the solder ball placement system and placed upon a workpiece. As the pickup tubes, such as the pickup tube 33, contact their respective solder balls, the tubes are forced slightly upwardly into the placement head against the force of the corresponding coil biasing spring. As the placement head continues to lower, all of the pickup tubes contact their corresponding solder balls; it is important to note that each of the pickup tubes is free to independently move vertically against the force of the corresponding biasing spring such that each pickup tube is free to contact its corresponding solder ball even though the individual solder balls may not be in a common horizontal plane. The ability of the solder ball placement system of the present invention to pickup and place solder balls even though there may be discontinuities or warpage in either the shuttle or the workpiece enables the system of the present invention to cope with common difficulties encountered in production.

The vacuum applied to the vacuum chamber 60 through the port 59 causes atmospheric pressure to force each solder ball against the lower end of the respective pickup tube and maintain the solder ball in that position until vacuum is removed from the pickup tube. The placement head is then raised and as the head is rising, the respective pickup tubes maintain contact with their corresponding solder balls and also simultaneously extend further through the openings such as the opening 35 in the vibrator plate 40 until the pickup tube collar such as collar 45 comes into contact with the inner surface 47 of the vibrator plate 42. Continued upward movement of the placement head then causes simultaneous vertical movement of all of the pickup tubes, each of which holds a corresponding solder ball.

The ball shuttle having thus been emptied by the action of the placement system of the present invention is the moved by other machine means out of position to thereby present the workpiece directly below the solder ball placement system. The placement head is then lowered until all of the pickup tubes have made contact through their respective solder balls with the workpiece. The pickup tubes are forced slightly into the placement head thus compressing their corresponding biasing springs; this "compliant" positioning affords the advantages described above when the workpiece surface may not fall within a single horizontal plane. When all of the pickup tubes have appropriately placed their corresponding solder balls on the appropriate positions on the workpiece, the vacuum is removed from the vacuum chamber 60 and thus the pressure is equalized between the vacuum chamber and ambient. The respective solder balls are no longer being held by the force of atmospheric pressure against the corresponding pickup tubes; however, since the solder balls may have a tendency to stick or adhere to the tips of the pickup tubes after the removal of vacuum (a result of possible contamination, flux, or slight deformation), a slight vibratory action is imparted to the pickup tubes through energization of the ejector solenoid imparting vertical vibratory motion to the vibrator plate 42 through the pole rods 77. The collars 45 of each of the pickup tubes 33 are in contact with the inner surface 47 of the vibrator plates and are thus caused to vertically vibrate as the vibrator plate is driven back and forth against the compression of the elastomer gasket 84 and preload springs 82. Obtaining vibratory motion from a solenoid and actuator plate incorporate common design expedients and by itself does not form part of the present invention except to the extent that the vibratory motion is imparted to the vibrator plate and thence to the pickup tubes as the placement head rises. That is, any vibrator design may be used to obtain the limited vertical oscillator motion. The result of the termination of the vacuum, and the imparting of limited vibratory vertical motion to the pickup tubes insures the release of all solder balls.

The presence or absence of solder balls at any time during the acquisition and holding of the solder balls by the placement system of the present invention is detected through the utilization of the diode array as described above in connection with FIG. 3. That is, each pickup tube is associated with a corresponding diode; the airflow from the tip of the pickup tube is utilized to cool one side of a diode; the temperature differential across the diode (the other end of which is thermally connected to a heat sink) results in a predetermined voltage drop thereacross. If a solder ball is captured by the pickup tube and held at the tip thereof, ambient air may no longer traverse the tube and is prevented from cooling the end of the diode. Accordingly, the corresponding diode no longer is subjected to the same temperature drop and the voltage drop thereacross will be measurably different. Sequentially addressing the individual diodes of the diode array thus presents an electrical voltage signal indicative of the presence or absence of a solder ball on each of the pickup tubes.

While the present invention has been described with reference to specific embodiments, it will be apparent to those skilled in the art that many modifications may be made without departing from the spirit and scope of the invention.

What is claimed:

1. A solder ball placement system comprising:
   (a) a body member mounted for vertical movement toward and away from a plurality of solder balls to be placed;
   (b) a plurality of pickup tubes each having an upper and a lower end and mounted for limited vertical movement with respect to said body member and extending therefrom to contact a respective solder ball;
   (c) vacuum means communicating with the upper end of each of said pickup tubes to enable said pickup tube to attract and hold respective solder balls at the lower end thereof; and
   (d) vibrator means contacting said pickup tubes for imparting vibratory motion thereto to facilitate release of solder balls held by said pickup tubes.

2. The combination set forth in claim 1 wherein said pickup tubes are mounted in a predetermined horizontal array.

3. The combination set forth in claim 1 wherein said body member includes a vacuum chamber and the upper ends of said pickup tubes extend into said chamber.

4. The combination set forth in claim 1 wherein said vibrator means includes a vibrator plate mounted on said body member having a plurality of holes each surrounding a different respective one of said pickup tubes.

5. The combination set forth in claim 4 wherein each of said pickup tubes includes an annular collar positioned to contact said vibrator plate when said tubes are in an extended position.

6. A solder ball placement system comprising:
   (a) a body member mounted for vertical movement toward and away from a plurality of solder balls to be placed;
   (b) a plurality of pickup tubes each having an upper and a lower end and mounted for limited vertical movement with respect to said body member and extending therefrom to contact a respective solder ball;
   (c) vacuum means communicating with the upper end of each of said pickup tubes to enable said pickup tube to attract and hold respective solder balls at the lower end thereof;
   (d) vibrator means contacting said pickup tubes for imparting vibratory motion thereto to facilitate release of solder balls held by said pickup tubes; and
   (e) sensing means responsive to the presence or absence of a solder ball held by each of said pickup tubes for providing signals indicating whether each of said pickup tubes is holding a respective solder ball.

7. The combination set forth in claim 6 wherein said pickup tubes are mounted in a predetermined horizontal array.

8. The combination set forth in claim 6 wherein said body member includes a vacuum chamber, and the upper ends of said pickup tubes extend into said chamber.

9. The combination set forth in claim 6 wherein said vibratory means includes a vibrator plate mounted on said body member having a plurality of holes each surrounding a different respective one of said pickup tubes.

10. The combination set forth in claim 9 wherein each of said pickup tubes includes an annular collar positioned to contact said vibrator plate when said tubes are in an extended position.

11. A solder ball placement system comprising:
    (a) a body member mounted for vertical movement toward and away from a plurality of solder balls to be placed;
    (b) a plurality of pickup tubes each having an upper and a lower end and mounted for limited vertical movement with respect to said body member and extending therefrom to contact a respective solder ball;

(c) vacuum means communicating with the upper end of each of said pickup tubes to enable said pickup tube to attract and hold respective solder balls at the lower end thereof;

(d) vibrator means contacting said pickup tubes for imparting vibratory motion thereto to facilitate release of solder balls held by said pickup tubes;

(e) sensing means responsive to the presence or absence of a solder ball held by each of said pickup tubes for providing signals indicating whether each of said pickup tubes is holding a respective solder ball;

(f) said sensing means including an array of electrical devices having PN junctions, each device corresponding to a different one of said pickup tubes;

(g) a heat source in thermal communication with one side of each of said devices;

(h) said vacuum means positioned for directing ambient air through each pickup tube onto an opposite side of each corresponding device to create a temperature differential across each such device; and (i) means response to said temperature differential across each device for generating an electrical signal indicating the absence of a solder ball at the lower end of each respective pickup tube.

12. The combination set forth in claim 11 wherein said pickup tubes are mounted in a predetermined horizontal array corresponding to the array of electrical devices.

13. The combination set forth in claim 11 wherein said electrical devices are diodes.

14. The combination set forth in claim 11 wherein said body member includes a vacuum chamber and the upper ends of said pickup tubes extend into said vacuum chamber.

15. The combination set forth in claim 11 wherein said vibrator means includes a vibrator plate mounted on said body member having a plurality of holes each surrounding a different respective one of said pickup tubes.

16. The combination set forth in claim 15 wherein each of said pickup tubes includes an annular collar positioned to contact said vibrator plate when said tubes are in an extended position.

* * * * *